United States Patent [19]
Leibowitz

[11] Patent Number: 5,260,617
[45] Date of Patent: Nov. 9, 1993

[54] ELECTRIC GENERATION SYSTEM

[75] Inventor: Martin N. Leibowitz, Hillsboro Beach, Fla.

[73] Assignee: Centergy, Inc., Hillsboro, Fla.

[21] Appl. No.: 939,297

[22] Filed: Sep. 2, 1992

[51] Int. Cl.$^5$ .......................................... H02K 23/60
[52] U.S. Cl. ................................ 310/120; 310/67 A; 310/114; 290/6
[58] Field of Search ............... 310/113, 118, 120, 121, 310/122, 114, 67 A, 75 C; 322/9; 290/1 D, 4 A, 4 R, 6, 47

[56] References Cited

U.S. PATENT DOCUMENTS

| | | | |
|---|---|---|---|
| 544,696 | 8/1895 | Smith | 290/47 |
| 4,498,015 | 2/1985 | Gottfried | 290/4 R X |
| 4,644,203 | 2/1987 | Thomas et al. | 310/67 A |
| 4,782,256 | 11/1988 | Kokubu | 310/67 A X |

FOREIGN PATENT DOCUMENTS 0461935 7/1928 Fed. Rep. of Germany ...... 310/114

Primary Examiner—Steven L. Stephan
Assistant Examiner—Ed To

[57] ABSTRACT

An electric generation system includes an electric generator swung in a orbit and having an external contact surface for rotation of its armature by a rolling engagement with an enlarged band. The band can be turned relative to the generator within a larger diameter retaining ring so that the band is constantly radially inclined at its contact point with the generator contact surface.

7 Claims, 4 Drawing Sheets

1

ELECTRIC GENERATION SYSTEM

FIELD OF THE INVENTION

The invention relates generally to electric generators and associated driving systems. More particularly, the invention relates to rotational electric generators and associated rotational drive mechanisms.

BACKGROUND OF THE INVENTION

Known electric generators typically include armatures constructed to rotate relative to stators to induce electric current in a conductive coil moving in an oscillating magnetic field. Typical generator constructions provide permanent or induced electromagnets disposed in alternating polarity on the inner surface of a stationary housing and a rotating armature having a coil assembly mounted on a magnetically conductive central core. In alternative embodiments, electric generators are known to have stationary coils disposed along the outer housing and a rotating core of permanent magnets. These conventional generators are typically driven by rotational power sources, such as steam turbines, combustion engines, wind turbines and water turbines.

SUMMARY OF THE INVENTION

It is an object of the invention to offer an electric generation system with capabilities of increased efficiency.

It is another object of the invention to provide an alternative means for driving a rotational electric generator.

These and other objects of the invention are achieved by an electric generation system including an electric generator which revolves in an orbit about a central shaft by a swing arm or other structure extending from the shaft. The generator has a circular contact surface, either on its housing or an associated disc mounted on the generator shaft, for rollingly engaging an enlarged band surrounding the generator and its swing arm. The contact surface is connected to the generator's armature which is thereby rotated to induce electric current in the coils of the generator.

According to the invention, the center of the surrounding band is offset from the center of the orbit of the generator. This band center is rotated in a circle about the orbit center such that the band moves as a whole along this imaginary circle. Due to the offset orientation of the rolling band, through proper synchronization with the orbit of the generator, the engaged surface of the band presents a radially outwardly directed surface in the forward path of the generator.

This radially outwardly directed surface is analogous to a downhill incline in a vertical plane. If the generator orbit and the associated band were shifted from their horizontal orientation to a vertical orientation, when the generator was disposed at the bottom of the orbit, the band would be tilted slightly downwardly in front of the advancing generator.

In the actual horizontal arrangement, the "downhill" orientation is manifested as a radially outward extension. This extension can be maintained in the horizontal plane by the continued offset rotation of the band in synchronization with the orbiting generator. Thus, at each instant of engagement, the rolling surface is radially inclined relative to the contact point with the generator contact surface.

This continued radial inclination of the band increases the efficiency of the generator rotation. The centrifugal force that is generated by the revolution of the generator in its orbit extends radially. This force extends along a radial line which is angled relative to the normal to the contact point between the generator and the band because of the band's inclination. The resulting moment produced by this angled force about the generator's central axis can increase the spin of the generator housing and the resultant electrical output of the generator.

According to a presently preferred embodiment of the invention, the band of the drive mechanism is disposed in a larger diameter retaining ring. A plurality of offset cams are equally spaced along the inner perimeter of the retaining ring and engage the band. The cams are mounted on rotating shafts so that the longer portion of each cam rotates into the interior opening of the retaining ring and then recedes. The rotations of the cams are coordinated so that the longer portion a one cam extends to push the band as the other cam extensions retract from the band. Thus, the band is rolled about the retaining ring by the offset cams as an advancing portion of the band engages the retaining ring with the opposite side of the band spaced from the retaining ring. This rotation about the retaining ring provides the continued outward radial extension of the band relative to the generator contact surface.

Although many conventional electric generators can be adapted for use in the electric generation system, a preferred generator includes an external armature and a centralized stator. The outer housing of the electric generator can support a circumferential series of permanent magnets which rotate with the housing relative to an internalized stationary group of electrically conductive coils mounted on a free spinning magnetically conductive core. The coils are fixed relative to the swing arm while the housing and the central core are rotatably mounted thereto.

Thus, the present invention provides alternative means for driving a rotational electric generator and offers increased efficiency in such rotation by utilizing inclined rolling engagement in a horizontal setting to accelerate a rolling mass and harness the force generated thereby.

BRIEF DESCRIPTION OF THE DRAWINGS

A greater understanding of the invention can be gained from a reading of the following detailed description with reference to the accompanying drawings, in which.

DETAILED DESCRIPTION OF THE PREFERRED EMBODIMENTS

Figures 1, 6:
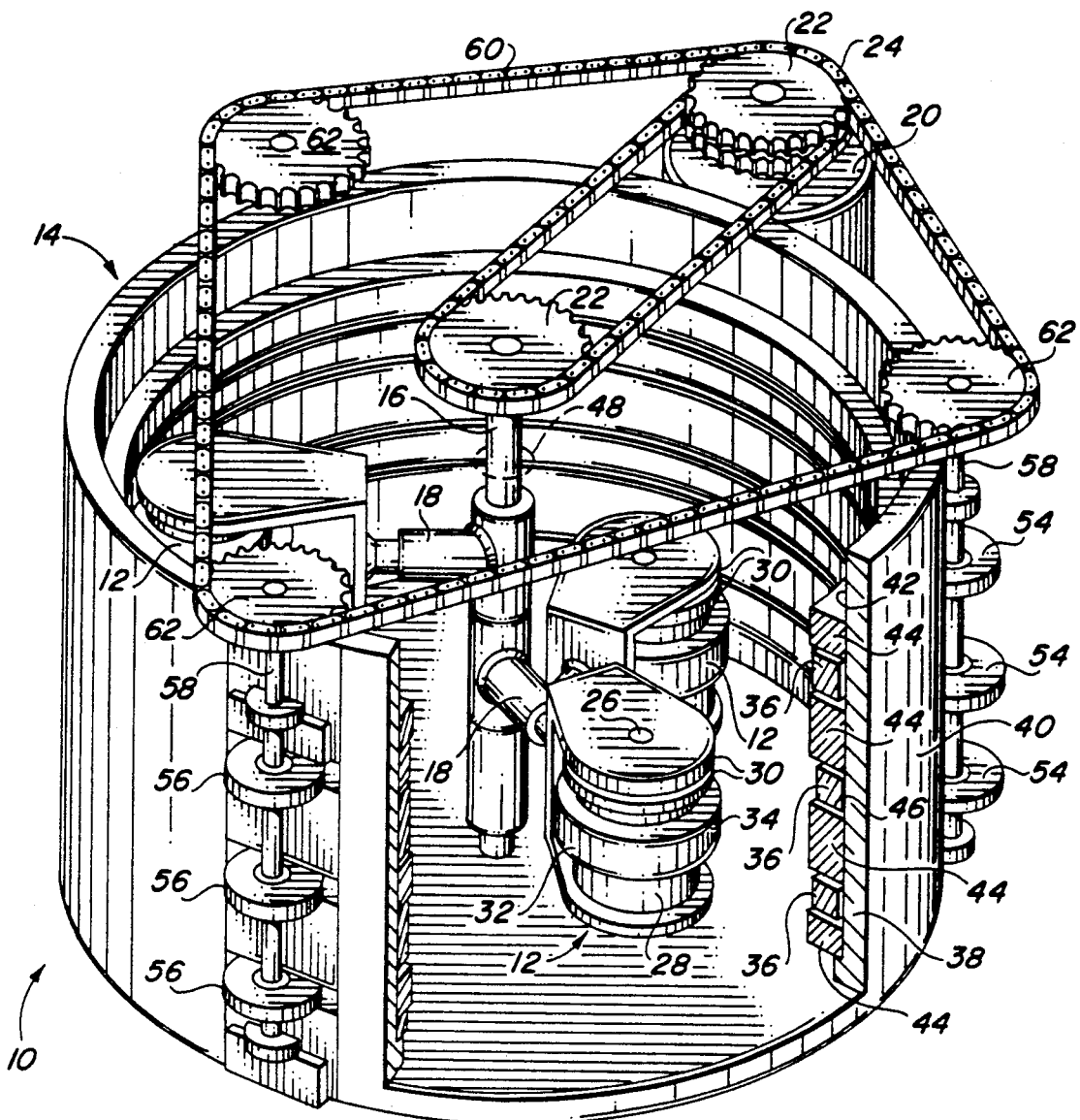
FIG. 1 is a perspective view of an embodiment of the invention with a cutaway for illustration purposes to expose additional generators.
FIG. 6 is a diagram illustrating the forces between a generator and a non-inclined band.

The present invention is directed to apparatus for generating electricity. Referring to the FIG. 1, the electric generation system 10 generally includes a rotational electric generator 12 and a drive assembly 14 for rotating the generator 12.

The system 10 preferably includes a plurality of generators 12 to provide balance about a central supporting shaft 16. Each generator 12 is connected to the drive shaft 16 by supporting means, such as swing arms 18, which are rotatably fixed to the supporting shaft 16. When three generators 12 are utilized, as shown, the swing arms 18 are spaced 120 degrees to provide static and dynamic balance.

The supporting shaft 16 can be driven by an external power source, such as a motor 20 linked to the shaft 16 by sprockets 22 and a chain 24. The shaft 16 can be driven by other torque sources, such as a turbine or an engine.

Figure 2:
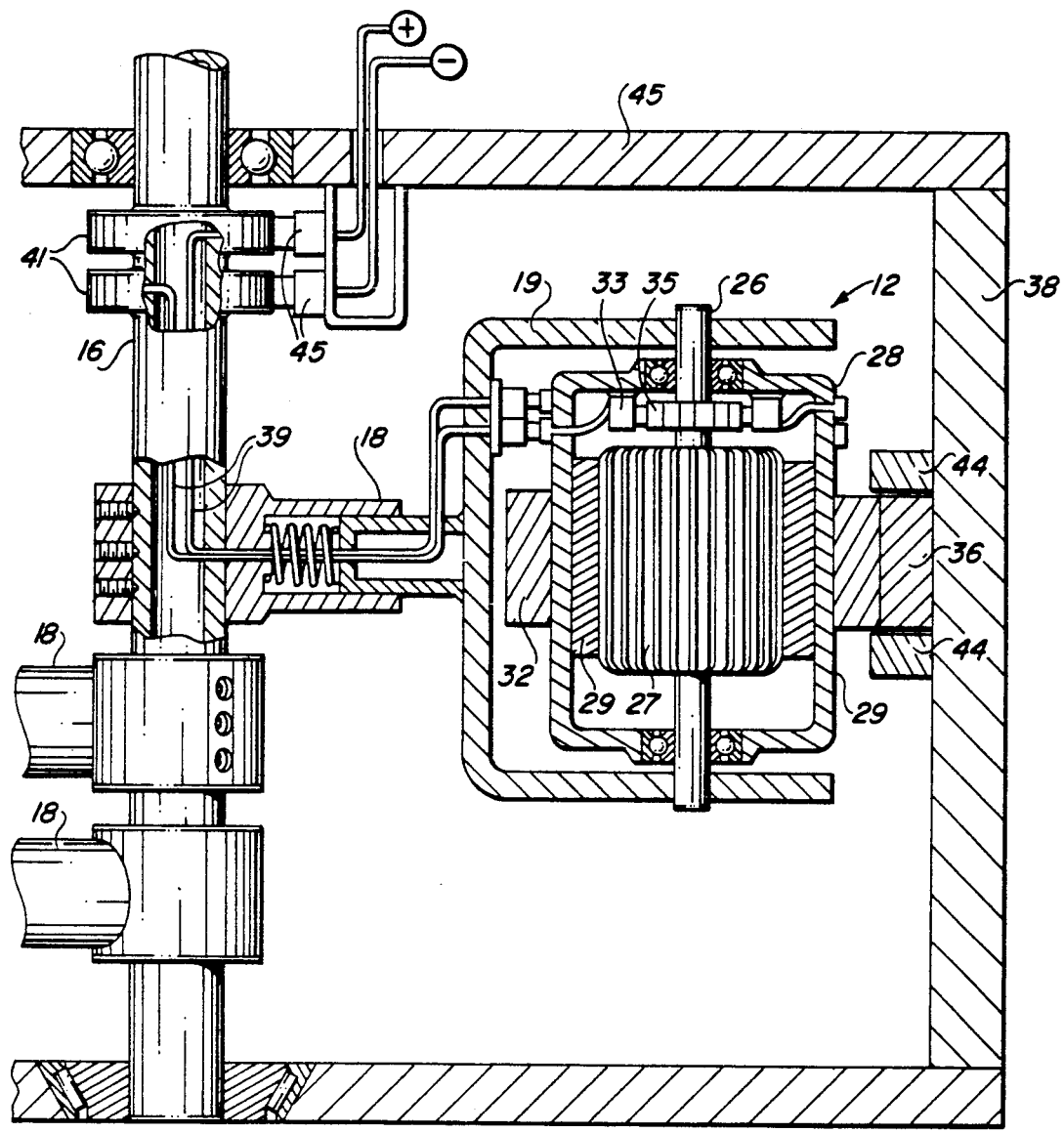
FIG. 2 is a mid-sectional view of the embodiment of FIG. 1, showing electric generation and distribution components of the embodiment.

The generators 12 revolve in equal orbits about the shaft 16, and each generator 12 is rotatably mounted to its swing arm 18. Referring to FIG. 2, each generator 12 can be mounted such that a central shaft 26 and associated electric coils 27 are fixed relative to the swing arm 18 and its bracket 19 while the housing 28 and associated magnets 29 are free to spin about the axis of the generator 12. A commutator 33 mounted to the shaft 26 and brushes 35 mounted to the housing 28 may be employed to collect the generated electric power. The housing 28 can provide rings 30 for transmitting the electric current to bracket brushes 37 for subsequent distribution through lines 39 running along the swing arm 18 and drive shaft 16 or by other known techniques for electricity distribution. The shaft 16 can also provide rings 4 for transmitting power to brushes 43, which can be attached to an optional top cover 45 for the system 10. Alternatively, each generator 12 can be mounted to its swing arm 18 so that the housing 28 is fixed while the central shaft 26 is free to spin. A variety of conventional generators, including single coil, double coil and three phase generators, can be adapted for use in the electric generation system 10.

As shown in FIG. 1, in order to rotate each housing 28 to generate electricity, each housing can also support a contact ring 32 having a contact surface 34 for engaging an enlarged band 36 surrounding the generator and swing arm. Alternatively, the contact surface 34 can be provided on a disc (not shown) mounted to a freely spinning central shaft of the generator while its housing is relatively fixed to the associated bracket.

As the generator 12 revolves in its orbit, the contact surface 34 rolls along the band 36. The rolling contact surface 34 and associated housing 28 and magnets 29 (FIG. 2) generate a field and induce a current in the enclosed coils 27 (FIG. 2).

The encircling band 36 at each level preferably has a diameter slightly less than twice the swing arm length and surrounds the generator 12 and its swing arm 18. The band 36 is preferably circular, but may be oval, and has a sufficient height to engage the enlarged contact ring 32 around the generator housing 28.

Each band 36 is disposed in a larger retaining ring 38 having a diameter greater than the diameter of the generator orbit about the drive shaft 16. In the case of a plurality of generators 12, the retaining ring 38 can be formed collectively as a cylindrical casing 40, which can also serve to support other components attendant to the system 10.

The retaining ring 38 has an annular inner wall 42 to which are mounted annular band supports 44. A portion of the band 36 is disposed between the supports 44 and is supported on top and bottom thereby. The band 36 is laterally supported between the generator contact ring 32 and the retaining ring wall 42.

As the generator contact ring 32 advances in its orbit, the engaged portion of the band 36 is disposed between the contact ring 32 and the retaining ring 38. Thus, the band 36 itself rolls about the inner wall 42 of the retaining ring 38, thereby providing a moving contact point 46 with the surrounding retaining ring wall 42.

As the contact point 46 of the band 36 with the surrounding retaining ring wall 42 advances around the circumference of the retaining ring wall 42, the band 36 undergoes two superimposed types of movement. First, the band center orbits in a circle 48 about the central shaft 16, and accordingly, the band 36 rotates as a whole about the shaft 16 in an offset pattern. As used in this specification and the appended claims, this offset rotation around the retaining ring wall 42 is referred to as the "rolling" of the band 36. Secondly, the band 36 spins about its own axis at a very slow rate due to its rolling engagement with the slightly larger diameter retaining ring 38.

According to the invention, the rolling of the band 36 is not controlled by the advancing generator 12, but rather by other means so that the circumferentially advancing engagement of the band 36 and the retaining ring 38 is positioned in front of the circumferentially advancing engagement point 5 between the band 36 and the generator contact surface 34.

The band 36 can be driven to roll by various means, but preferably, the drive means includes a plurality of offset cams 52, 54, 56 (see also, FIG. 3) located around the periphery of the retaining ring wall 42. The cams 52, 54, 56 are eccentrically mounted on rotating shafts 58, which extend transverse to the plane of the retaining ring 38. The cam 52, 54, 56 are partially disposed within the perimeter of the retaining ring 38 to continuously contact the band 36. The rotation of the offset cams 52, 54, 56 can be synchronized with the orbit of the generators 12 by a chain linkage 60 and driving sprockets 62 attached to the shafts 58.

Figure 3:
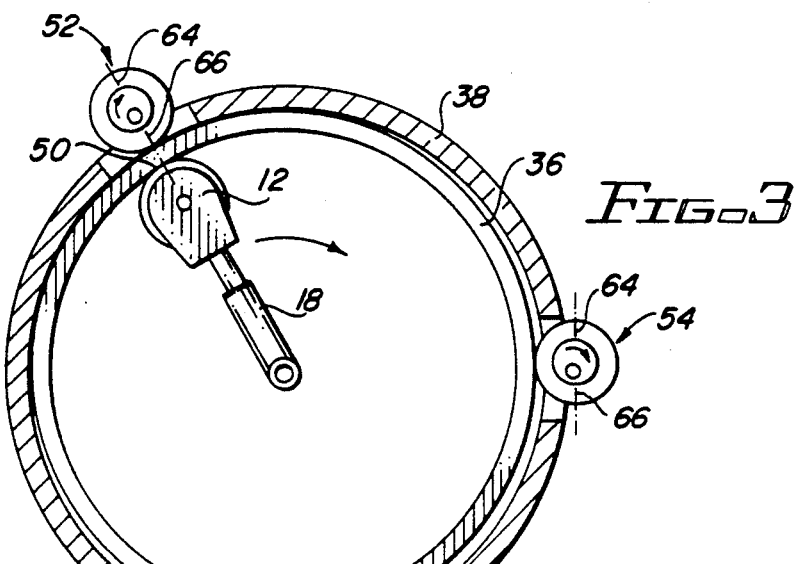
FIG. 3 is the first of a series of plan views of the invention, illustrating the travel of a generator and the synchronized offset rotation of a surrounding band by offset cams.
Figure 4:
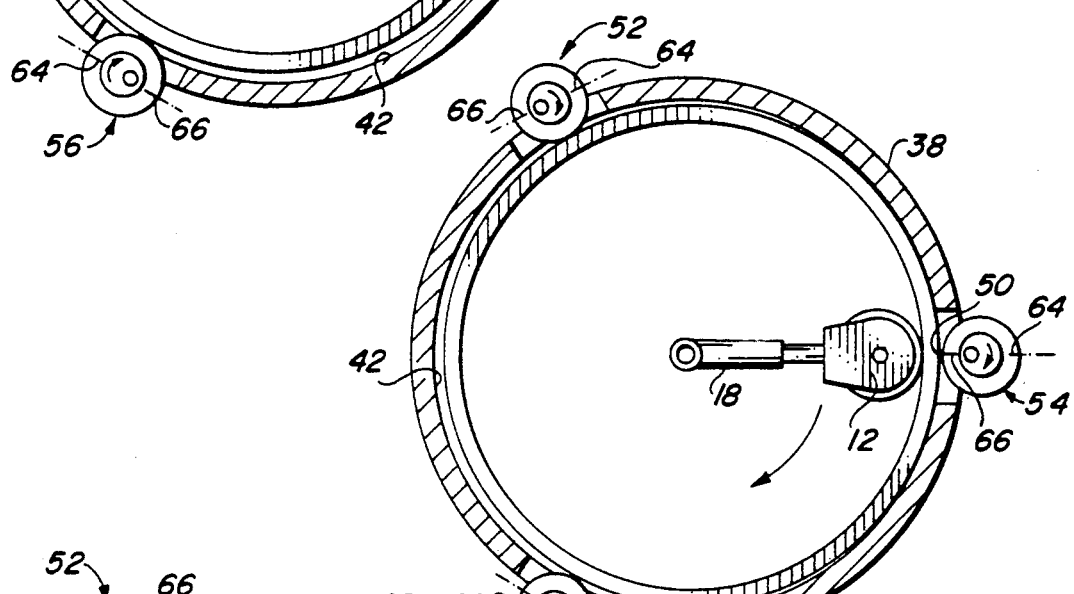
FIG. 4 is the second view of the series.
Figure 5:
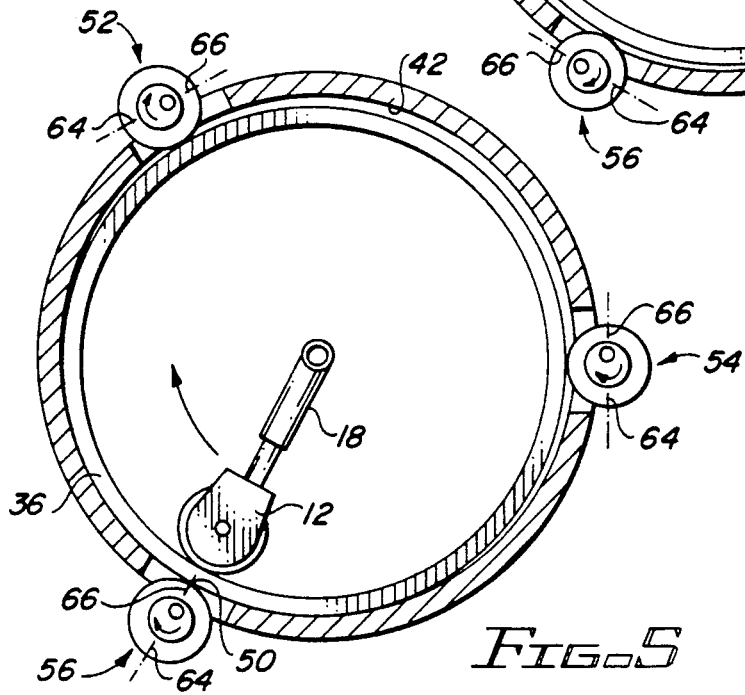
FIG. 5 is the third view of the series.

Referring to FIGS. 3-5, each offset cam 52, 54, 56 has a relatively longer radial extension 64 diametrically opposed by a relatively shorter radial extension 66 with transitional extensions located between these extremes along the perimeter of each of the cams 52, 54, 56. As shown in FIG. 3, as the cam 52 is rotated, the longer extension 64 is cycled into the interior of the retaining ring 38. The longer extension 64 urges the band 36 away from the retaining ring wall 42 adjacent cam 52 while the other cams 54, 56 retract their longer extensions 64 to permit the band 36 to move toward the retaining wall 42 adjacent cam 54. Next, as shown in FIG. 4, cam 54 begins to extend into the band 36 while cams 52, 56 retract to urge the band 36 toward the retaining wall 42 at cam 56. Next, as shown in FIG. 5, cam 56 begins to extend into the band 36 while cams 52, 54 retract to urge the band 36 toward the retaining wall 42 at cam 52.

The rotations of the cams 52, 54, 56 are coordinated to retract and extend so that the band 36 rolls about the retaining ring wall 42.

While spinning of the generator 12 could be achieved by rolling the generator contact surface 34 about a fixed band, increased rolling efficiency for the generator 12 can be achieved according to the invention if the rolling band 36 is radially "tilted" in front of the advancing generator 12. As set forth above, the offset cams 52, 54, 56 are preferably coordinated with the orbit of the generator 12 so that the band 36 engages the retaining wall 42 at a point 46 in front of the generator engagement point 50.

Figure 7:
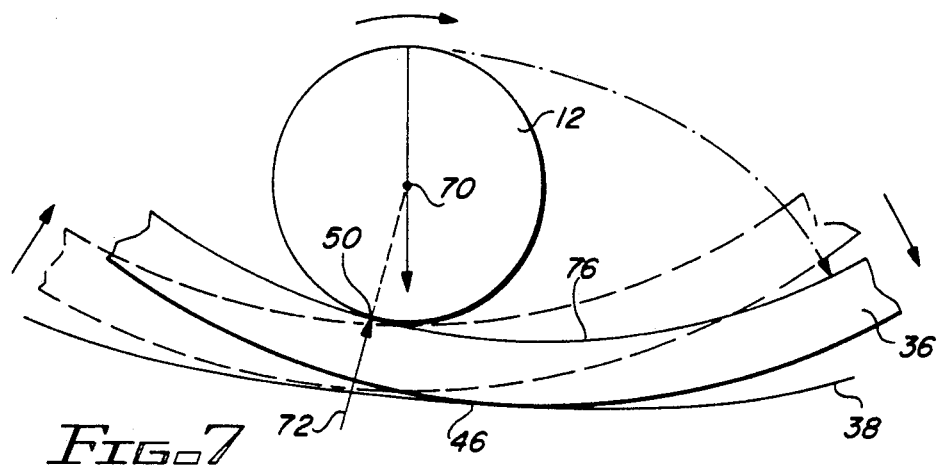
FIG. 7 is a diagram illustrating the forces between the generator and a band when the band is inclined at the contact point.

Referring to FIG. 6, the engagement of an orbiting generator 12 with a fixed, non-rolling band 68 would result in an alignment of the centrifugal force 70 with the normal force of engagement 72. Thus, no rolling moment would be created about the point of contact 74. However, referring to FIG. 7, if the band 36 is radially inclined so that the engagement point 46 of the band 36 with the retaining ring 38 is in front of the contact point 50 between the orbiting cylinder 12 and the band 36, the normal 72' to the point of contact 50 will be angled relative to the radial centrifugal force 70. Thus, the centrifugal force 70 will generate a moment about the contact point 50, contributing to the spin of the orbiting generator 12.

Due to the offset orientation of the rolling band 36, through proper synchronization with the orbit of the generator 12, the rolling band 36 presents a radially outwardly directed surface 76 in the forward path of the generator 12.

This extension 76 can be maintained in the horizontal plane by the continued offset rotation of the band 36 in synchronization with the orbiting generator 12. Thus, at each instance of engagement, the surface 76 is radially inclined relative to the contact point 50.

Referring again to FIGS. 3-5, the enlarged band 36 also offers efficiencies and mechanical advantage in maintaining the inclined orientation of the band 36 relative to the contact point 50 of the band 36 with the generator contact surface 34. By moving the band 36 proximate its opposite end, a leverage length approximately the diameter of the band 36 is obtained. Thus, the extending cams 52, 54, 56 need only impart a relatively lower force to "tilt" or "topple" the band 36 about its contact point 46 with the retaining ring 38 in comparison to alternative moving agents placed closer to the point of contact 46.

The shaft 16 can be driven by the motor 20 in conjunction with the offset cams 52, 54, 56 to revolve each generator 12 in its orbit while the generator contact surface 34 rolls the generator housing 28 about the rolling band 36. When the generator reaches a steady state of revolution due to the driving forces of the rolling and radially extending band 36, it is also possible to drive the generator 12 in its orbit without the additional torque initially provided by the motor 20 through the support shaft 16. Alternatively, to initially revolve each generator 12 in its orbit, electric power can be supplied to the coils 27 of the generator 12 so that the generator performs as a motor, transitioning to a generator performance as the predetermined speed of revolution is achieved by the driving of the rolling band 36. When the rolling band 36 becomes the driving mechanism for revolving the generators 12, the shaft 16 can become a source of mechanical torque output in addition to or instead of the generator electrical output.

Figure 8:
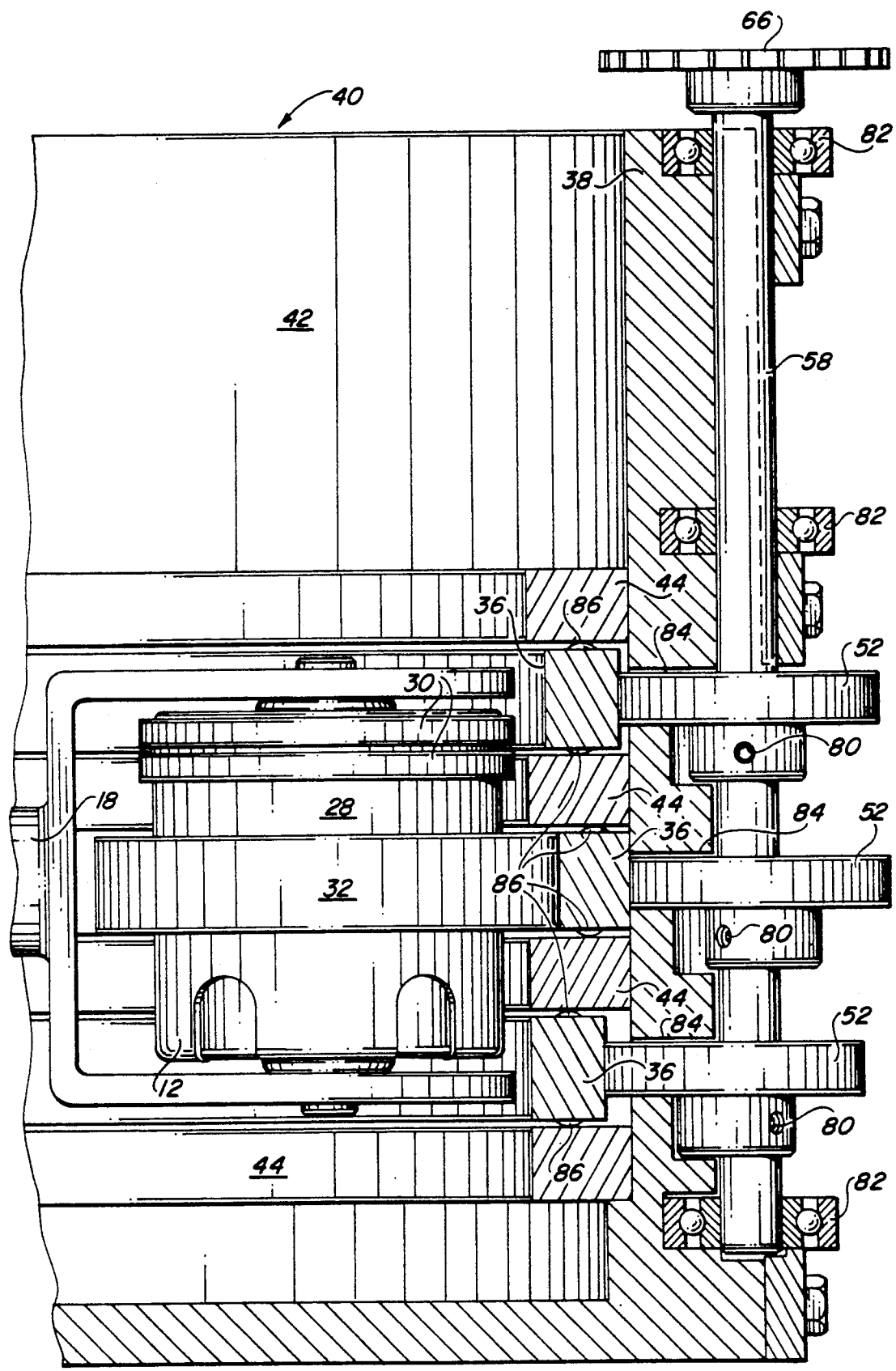
FIG. 8 is partial sectional side view of the driving assembly of the invention shown in FIG. 1.

Referring to FIG. 8, at each 120 degree location on the retaining ring 38, the offset cams 52, 54, 56 can be mounted on the shaft 58 and secured axially by set screws 80. A series of three roller bearings 82 can be provided to allow rotation of the shaft 58 relative to the retaining ring casing 40. A set of slots 84 can be machined in the retaining ring wall 42 to permit insertion of the offset cams 52 (54, 56, not shown) into the interior for continuous engagement with the bands 36.

As each generator 12 is spaced 120 degrees apart from the other generators 12, the generator 12 can be arranged vertically in a compact fashion so that the bands 36 can share intermediate supports 44. The bands 36 can be spaced for sliding engagement with the supports 44 by TEFLON buttons 86. Alternatively, each band 36 can provide roller bearings (not shown) along its lower surface for engagement with the lower support. Each roller bearing comprises a series of three ball bearings supporting a larger ball bearing in tripod fashion. The three support bearings contact the rolling surface and roll more efficiently against the round surface of the larger bearing.

The retaining ring casing 40, the bands 36 and the generator contact rings 32 are preferably constructed of steel. The support rings 44 surrounding the band 36 are also preferably constructed of steel. Each band 36 can have a variety of cross sectional shapes according the strength and heat dissipation qualities needed for a particular application, including T-, L- or I-shaped or honeycombed.

The band 36 can be driven into roll about the retaining ring wall 42 in other ways. The band 36 can be urged away from a portion of the wall 42 and attracted generally to the opposite side of the wall 42 by controlled solenoids which impact the band 36 in coordinated fashion to induce roll. Alternatively, a series of controlled magnets arranged around the retaining ring periphery can selectively attract the band 36 to induce roll.

Although preferred versions of the invention have been described with a degree of particularity, these embodiments are intended only as examples of possible structure to enable a person skilled in the art to make and use the invention and are not intended to limit the scope of the invention. Alternative constructions are possible and may become apparent after a reading of the specification. For example, in another embodiment, the rolling band can be mounted to support structure through offset bearings arranged to permit the rolling band to rotate as a whole about an axis offset from the orbital axis of the generator 12. The rolling band rotation is coordinated with the rotation of the generator 12 by timing belts or the like to continuously present a radially inclined path forward of the advancing generator 12. The offset cams 52, 54, 56 can be timed relative to the orbits of the generators 12 by various means including timing belts, chain-linked sprockets (as shown in the figures), and electric or magnetic clutch assemblies.

Accordingly, the scope of the invention should not be determined from the foregoing description, but rather from a reasonable interpretation of the claims.

I claim:

1. An electric generation system, comprising:
   at least one electric generator having an armature and a stator and an external, circular contact surface connected to said armature;

means for supporting said generator in an orbit about an axis a distance from a central axis of said generator; and a drive assembly including:
- a band having an inner surface for engaging said generator contact surface, whereby said contact surface and said armature roll along said inner surface and rotate relative to said stator to induce electric current;
- a retaining ring having a larger diameter and radially surrounding said band wherein said band can roll around the circumference of said ring while maintaining contact with a portion of said circumference; and
- means for driving said band to roll around said ring circumference.

2. The system according to claim 1, wherein said contact surface is formed by a ring on a housing on the generator, said armature being mounted on an interior of said housing.

3. The system according to claim 1, wherein said driving means includes a plurality of offset cams, each mounted to rotating shafts which extend transverse to said ring equally spaced around said ring circumference, the rotation of the cams be coordinated so that at least one of said offset cams extends toward the band as at least one other offset cam recedes from the band, thereby continually urging the band toward a portion of the ring circumference and away from another portion of the ring circumference to induce the band to roll about the ring circumference.

4. The system according to claim 3, wherein the rotation of the offset cam shafts are timed relative to the orbiting of the generator so that the contact surface engages the band behind the point the band engages the retaining ring.

5. The system according to claim 1, wherein a swinging means includes a support shaft extending transversely through the center of the retaining ring and a swing arm extending from said support shaft to connect to the electric generator.

6. An electric generation system, comprising:
- at least three electric generators, each having an armature and a stator and an external, circular contact surface connected to said armature;
- means for supporting said generators in an orbit about a common axis a distance from a central axis of each generator; and
- at least three drive assemblies, one assembly for each generator and including:
  - an annular band having an inner surface for engaging said contact surface, whereby said contact surface and said armature roll along said inner surface and rotate relative to said central axis to induce electric current;
  - a retaining ring having larger diameter and radially surrounding said band wherein said band can roll around the circumference of said ring while maintaining contact with a portion of said circumference; and
  - means for driving said band to roll around said ring circumference;

wherein each electric generator and drive assembly is vertically aligned with the other electric generators and drive assemblies and wherein the electric generators orbit out of phase with each other.

7. The system according to claim 6, wherein the generators orbit 120 degrees out of phase from each other.

* * * * *